United States Patent Office 3,314,944
Patented Apr. 18, 1967

3,314,944
6-METHYL-19-NOR STEROIDS AND INTER-
MEDIATES THEREFOR
Patrick A. Diassi, Westfield, and Raymond C. Erickson,
Metuchen, N.J., assignors, by mesne assignments, to
E. R. Squibb & Sons Inc., New York, N.Y., a corporation of Delaware
No Drawing. Filed Oct. 29, 1964, Ser. No. 407,513
4 Claims. (Cl. 260—239.55)

This invention relates to and has as its object the provision of new physiologically active steroids, methods for preparing the same, and new intermediates useful in said preparation.

The final products of this invention can be represented by the formula

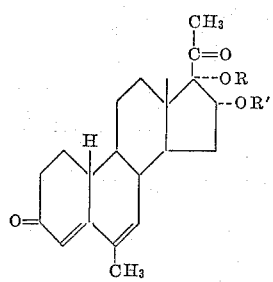

wherein R and R' each represents hydrogen; and together R and R' is

wherein P represents hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with carbon to which they are joined P and Q is a monocyclic cycloalkyl or monocyclic heterocyclic radical.

The final products of this invention are physiologically active substances which possess progestational activity and hence, can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets. Moreover, it has surprisingly been found that the compounds of this invention are many times more active than are the corresponding 10-methylated derivatives.

In the most preferable embodiment of this invention, P is lower alkyl and Q is selected from the group consisting of lower alkyl (e.g., methyl) and monocyclic aryl (e.g., phenyl).

The final products of this invention are prepared according to the novel processes of this invention, which may be represented by the following equations wherein R, P and Q are as hereinbefore defined.

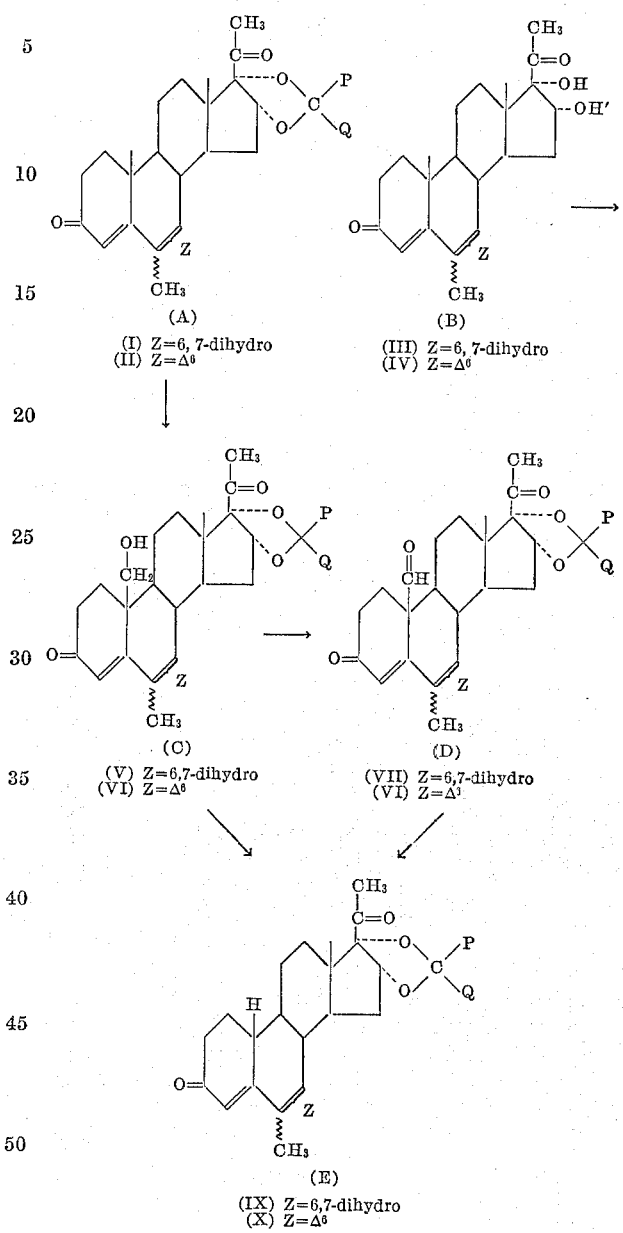

The starting materials of this invention (Compounds A and B), i.e., 6α-methyl-16α,17α-dihydroxyprogesterone; 6 - methyl - 6 - dehydro - 16α,17α - dihydroxyprogesterone; 6α - methyl - 16α,17α - dihydroxyprogesterone 16,17-acetonide; 6α - methyl - 16α,17α(β - methyl - α - phenylmethylenedioxy)-progesterone; 6-methyl-6-dehydro - 16α, 17α-dihydroxyprogesterone 16,17-acetonide; 6-methyl-6-dehydro - 16α,17α - dihydroxyprogesterone 16,17 - acetophenonide may be prepared according to the procedures and disclosures of copending application Ser. No. 99,732, filed Mar. 31, 1961, in the names of Patrick A. Diassi and Josef Fried and application Ser. No. 830,467, filed July 30, 1959, in the name of Josef Fried.

In the first step of the process of this invention, the starting material (Compounds A and B) is subjected to the action of a microorganism selected from the group consisting of *Corticium microsclerotia, Corticium sasakii, Corticium praticola, Hypochnus sasakii* and *Pellicularia filamentosa* or to the action of the enzymes thereof under oxidizing and preferably aerobic conditions.

To prepare the 19-hydroxy compounds of this invention (Compounds C), the starting materials (Compounds A and B) may first be subjected to the action of the enzymes selected from the group consisting of *Corticium microsclerotia* NRRL–2727, *Hypochnus sasakii* ATCC–13290, *Pellicularia filamentosa* ATCC–13289, *Corticium praticola* NRRL–2724, and *Corticium sasakii* NRRL–2705 under oxidizing conditions. This oxidation can best be effected either by including the starting material in an aerobic culture in the desired microorganism or by bringing together in an aqueous medium the compounds, air and enzymes of non-proliferating cells of the microorganism.

In general, the conditions of culturing the microorganism for the purposes of this invention are (except for the inclusion of the starting materials to be converted), the same as those of culturing various other microorganisms for the production of antibiotics, vitamin B–12, and other like substances. The microorganism is grown aerobically in contact with (in or on) suitable fermentation medium. A suitable medium essentially comprises a source of carbon and energy. The latter may be a carbohydrate, for example, molasses, glucose, maltose, starch or dextrin, a fatty acid, a fat and/or the compound itself. Preferably, however, the medium includes an assimilable source of carbon and energy in addition to the steroid. Among the fats utilizable for the purpose of this invention are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Among the fatty acids utilizable for the purpose of this invention are stearic acid, palmitic acid, oleic acid, linoleic acid and myristic acid.

The source of nitrogenous factors utilizable for the purposes of this invention may be organic (e.g., soybean meal, cornsteep liquor, yeast extract, meat extract and/or distillers' solubles) or synthetic (i.e., composes of simple synthesizable organic or inorganic compounds, such as ammonium salts, alkali nitrates, amino acids or urea).

An adequate sterile air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of the concentration of the compound in the culture is about 0.01% to about 0.2%. The culture period (or rather the time of subjecting the compound to the action of the enzyme) may vary considerably, the range of about eight to ninety-six hours being feasible, but not limiting.

The 16α,17α-ketal or acetal derivatives of the 6-methyl-19-hydroxyprogesterone (Compounds C) may then be oxidized as by treatment with chromic anhydride in sulfuric acid, to yield the 16α,17α-ketal or acetal derivatives of 6-methyl-19-oxo-progesterone (Compounds D), which are also new compounds of this invention.

To obtain the 16α,17α-ketal or acetal derivatives of 6-methyl-19-norprogesterone, the final products of this invention (Compounds E) the 16α, 17α-ketal or acetal derivatives of 6 - methyl-19-hydroxyprogesterone (Compounds C) and 6-methyl-19-oxoprogesterone (Compounds D) may be hydrolyzed as by treatment with an alkali metal hydroxide, such as potassium hydroxide or sodium hydroxide.

If a ketal or acetal group other than that present in the intermediate or final compounds or starting material is desired, the respective product may be cleaved by treatment with aqueous formic acid to yield the respective 16α,17α-dihydroxy intermediates. These intermediates are then reacted with an aldehyde or ketone of the formula

wherein P and Q are as hereinbefore defined. The reaction is preferably carried out by treating a suspension or solution of the 16,17-dihydroxy steroid in the aldehyde or ketone (or an organic solvent and the aldehyde or ketone, if the aldehyde or ketone is a solid) with an acid catalyst (e.g., perchloric acid, p-toluenesulfonic acid, hydrochloric acid, etc.), neutralizing the acid and recovering the acetal or ketal derivative formed. Suitable aldehyde and ketone reactants include those set forth in U.S. Patent 3,077,471, issued Feb. 12, 1963.

The following examples are illustrative of the invention (all temperatures being in centigrade):

EXAMPLE 1

*6α-methyl-16α,17α,19-trihydroxyprogesterone 16,17-acetonide*

Surface growth from ten to fourteen-day-old agar slant cultures of *Corticium microsclerotia* (NRRL 2727—Northern Regional Research Laboratories, Peoria, Illinois), the slant containing a sterilized nutrient medium A:

| | |
|---|---:|
| Baby oatmeal | g__ 20.0 |
| Tomato paste | g__ 20.0 |
| Agar | g__ 15.0 |
| Tap water | l__ 1.0 | is suspended in 5.0 ml. of a 0.01% Duponal (wetting agent) aqueous solution. One ml. portions of the suspension from two slants are used to inoculate six 250 ml. conical flasks, each containing 50 ml. of the following sterilized medium B:

| | G. |
|---|---:|
| Glucose | 30.0 |
| Soy bean meal | 20.0 |
| Soy bean oil | 2.2 |
| CaCO$_3$ | 2.5 |
| Distilled water to 1 liter. | |

After four days incubation at 25° on a rotary shaker operating at 280 cycles per minute with a stroke of 2", 10% (v.:v.) transfers are made to 50 conical flasks each containing 50 ml. of the following sterilized medium C adjusted to pH 7.0:

| | G. |
|---|---:|
| Corn steep liquor | 6.0 |
| NH$_4$H$_2$PO$_4$ | 3.0 |
| Yeast extract | 2.5 |
| Dextrose | 10.0 |
| CaCO$_3$ | 2.5 |
| Distilled water to 1 liter. | |

After one day of incubation under the conditions described for medium B, 6α-methyl-16α,17α-dihydroxyprogesterone is added to each flask as 0.25 ml. of a sterile solution containing 10.0 mg. of the steroid in N,N-dimethylformamide. A total of 500 mg. is used. After twenty-four hours of further incubation, the contents of the flasks are pooled, the culture filtered on a Buchner funnel through a Seitz clarifying pad and washed with water. The combined filtrate and washings are extracted three times with 800 ml. portions of ethyl acetate which are combined, washed twice with 1 liter portions of water, dried over sodium sulfate and evaporated to dryness, in vacuo. The residue is dissolved in 35 ml. of acetone containing 0.035 ml. of perchloric acid and left at room temperature for sixteen hours. The reaction mixture is then neutralized with 5% sodium bicarbonate diluted with water and extracted with ethyl acetate. The ethyl acetate is washed with water, dried over sodium sulfate, and evaporated to dryness, in vacuo. This residue is then dissolved in 15 ml. of dry pyridine, 5 ml. of acetic anhydride are added and the solution kept at room temperature for fifteen hours protected from moisture. After hydrolysis of the excess acetic anhydride with ice water, the mixture is extracted several times with chloroform and the combined chloroform extracts washed successively with 2 N hydrochloric acid, 5% sodium bicarbonate and water, dried and evaporated to dryness, in vacuo. The residue is dissolved in a few milliliters of chloroform and adsorbed onto a plate (4 mm. x 20 cm. x 30 cm.) of Woelm neutral alumina (Activity V). Development of the plate with chloroform gives three principal bands detectable by ultraviolet light at Rf 0.7–0.8 and 0.5, respectively.

One of the bands having Rf 0.7–0.8 is eluted with ethyl acetate and evaporated to dryness, in vacuo. The residue is dissolved in 10 ml. of methanol, 1.0 ml. of 10% potassium carbonate is added and the mixture stirred at room temperature for sixteen hours. The solution is then neutralized with 10% acetic acid, diluted with water, and extracted with chloroform. The chloroform is washed with water and evaporated to dryness, in vacuo. The residue is plate chromatographed using Woelm neutral alumina (Activity I) as adsorbant and chloroform: ethyl acetate (10:1) as developing solvent to give a band detectable by U.V. at Rf 0.6 which on elution with ethyl acetate, evaporation of the solvent, in vacuo, and crystallization of the residue from acetone-hexane gives 6α-methyl-16α,17α,19-trihydroxyprogesterone 16,17-acetonide.

EXAMPLE 2

*6α-methyl-16α,17α,19-trihydroxyprogesterone 16,17-acetonide*

(A) Five flasks of medium inoculated (10%, v.:v.) with inoculum obtained as described in Example 1. After one day of incubation as described in Example 1, 6α-methyl-16α,17α-dihydroxyprogesterone is added to each flask as 1.0 ml. of a solution containing 100 mg. of the steroid as the cycloborate ester. The solution is prepared by mixing 500 mg. of the steroid, 2.5 ml. of methanol, and 95 mg. of $Na_2B_4O_7 \cdot 10H_2O$ dissolved in 1.9 ml. of water in a test tube and heating at 90° in a water bath until the material is solubilized. The volume of the solution containing the cycloborate ester is adjusted to 5.0 ml. with water before use. After forty-eight hours of further incubation, the contents of the flasks are pooled and the culture filtered on a Buchner funnel through a Seitz clarifying pad. The filtrate is acidified to about pH 3.5 by treatment with a mineral acid, such as sulfuric acid, thereby hydrolyzing the 16,17-cycloborate ester group and yielding the free 16α,17α-dihydroxyfunctional groups.

(B) Following the procedure for the extraction, acetonation, acetylation, hydrolysis and isolation described in Part A of this example, there is obtained 6α-methyl-16α,17α,19-trihydroxyprogesterone 16,17-acetonide.

EXAMPLE 3

*6α-methyl-16α,17α,19-trihydroxyprogesterone 16,17-acetonide*

Following the procedure of Example 1, but substituting 6α-methyl-16α,17α-dihydroxyprogesterone 16,17-acetonide for the 6α-methyl-16α,17α-dihydroxyprogesterone and eliminating that part of the procedure involving reaction with acetone and perchloric acid, there is obtained 6α-methyl-16α,17α,19-trihydroxyprogesterone 16,17-acetonide.

EXAMPLE 4

*6α-methyl-19-hydroxy-16α,17α-(β-methyl-α-phenylmethylenedioxy)-progesterone*

Following the procedure of Example 1, but substituting 6α-methyl - 16α,17α-(β-methyl-α-phenylmethylenedioxy)-progesterone for the 6α-methyl-16α,17α-dihydroxyprogesterone and eliminating that part of the procedure involving reaction with acetone and perchloric acid, there is obtained 6α-methyl-19-hydroxy - 16α,17α-(β-methyl-α-phenylmethylenedioxy)-progesterone.

EXAMPLE 5

*6-methyl-6-dehydro-16α,17α,19-trihydroxyprogesterone 16,17-acetonide*

Following the procedure of Examples 1 and 2, but substituting 6-methyl-6-dehydro - 16α,17α-dihydroxyprogesterone for 6α-methyl - 16α,17α-dihydroxyprogesterone, there is obtained 6-methyl-6-dehydro - 16α,17α,19-trihydroxyprogesterone 16,17-acetonide.

EXAMPLE 6

*6-methyl-6-dehydro-16α,17α,19-trihydroxyprogesterone 16,17-acetonide*

Following the procedure of Example 3, but substituting 6-methyl - 6-dehydro - 16α,17α - dihydroxyprogesterone 16,17-acetonide for the 6α-methyl - 16α,17α-dihydroxyprogesterone 16,17-acetonide, there is obtained 6-methyl-6-dehydro-16α,17α,19-trihydroxyprogesterone 16,17-acetonide.

EXAMPLE 7

*6-methyl-6-dehydro-19-hydroxy-16α,17α-(β-methyl-α-phenylmethylenedioxy)-progesterone*

Following the procedure of Examples 1 and 2, but substituting 6-methyl - 6-dehydro - 16α,17α-dihydroxyprogesterone for the 6α-methyl-16α,17α-dihydroxyprogesterone and acetophenone for the acetone in the ketalization part of the experiment, there is obtained 6-methyl-6-dehydro-19-hydroxy - 16α,17α - (β-methyl-α-phenylmethylenedioxy)-progesterone.

EXAMPLE 8

*6-methyl-6-dehydro-19-hydroxy-16α,17α-(β-methyl-α-phenylmethylenedioxy)-progesterone*

Following the procedure of Example 3, but substituting 6 - methyl - 6 - dehydro-16α,17α-(β-methyl-α-phenylmethylenedioxy)-progesterone for the 6α-methyl-16α,17α-dihydroxyprogesterone 16,17-acetonide, there is obtained 6 - methyl - 6 - dehydro-19-hydroxy-16α,17α-(β-methyl-α-phenylmethylenedioxy)-progesterone.

EXAMPLE 9

*6α-methyl-16α,17α,19-trihydroxyprogesterone 16,17-acetonide*

Following the procedures of Examples 1 to 8, but substituting any one of the following organisms: *Corticium sasakii, Corticium praticola, Hypochnus sasakii,* and *Pellicularia filamentosa* for the *Corticium microsclerotia*, there is obtained 6α-methyl-16α,17α,19-trihydroxyprogesterone 16,17-acetonide.

EXAMPLE 10

*6α-methyl-16α,17α-dimethylmethylenedioxy-19-oxoprogesterone*

To a solution of 6α-methyl-16α,17α-methylenedioxy-19-hydroxyprogesterone in 3 ml. of reagent grade acetone is added dropwise 0.78 ml. of a solution containing 200 mg. of chromic anhydride and 132 ml. of sulfuric acid in 9 ml. of acetone and 1 ml. of water. After five minutes the excess oxidizing agent is decomposed with a few drops of methanol and the mixture filtered and washed with acetone. The filtrate is diluted with water and extracted with chloroform. The chloroform is evaporated to dryness in vacuo and the residue chromatographed on alumina (Activity V) to give on crystallization 6α-methyl-16α,17α-dimethylmethylenedioxy-19-oxoprogesterone.

EXAMPLE 11

*6α-methyl-16α,17α-(β-methyl-α-phenylmethylenedioxy)-19-oxoprogesterone*

Following the procedure of Example 10, but substituting 6α - methyl - 16α,17α-(β-methyl-α-phenylmethylenedioxy) - 19-hydroxyprogesterone for 6α-methyl-16α,17α-dimethylmethylenedioxy-19-hydroxyprogesterone, there is obtained 6α - methyl-16α,17α-(β-methyl-α-phenylmethylenedioxy)-19-oxoprogesterone.

EXAMPLE 12

*6α-methyl-16α,17α-dimethylmethylenedioxy-19-norprogesterone*

To a solution of 30 mg. of 6α-methyl-16α,17α-dimethylmethylenedioxy-19-hydroxyprogesterone in 20 ml. of methanol is added a solution of 1.3 g. of potassium hydroxide in 10 ml. of water and the resulting solution left at room temperature for eighteen hours. The solution is then concentrated in vacuo at 0° C. diluted with water and extracted with ether. The ether is washed with water, dried over sodium sulfate and evaporated to dryness in vacuo. Thick layer plate chromatography of the residue using Activity V Woelm neutral alumina and chloroform:hexane (1:4) as solvent gives a band detectable by U.V. at Rf 0.5 which on elution with ethyl acetate and crystallization of the residue yields 6α-methyl-16α,17α-dimethylmethylenedioxy-19-norprogesterone.

EXAMPLE 13

*6α-methyl-16α,17α-dimethylmethylenedioxy-19-norprogesterone*

A solution of 200 mg. of 6α-methyl-16α,17α-dimethylmethylenedioxy-19-oxoprogesterone in 14 ml. of methanol is added to 150 ml. of 4% sodium hydroxide and the mixture warmed at 50–55° for forty-five minutes. The reaction mixture is cooled, extracted with ether, the ether washed with water, dried and evaporated to dryness. Crystallization of the residue following purification by chromatography as described in Example 12 gives 6α-methyl - 16α,17α - dimethylmethylenedioxy - 19 - norprogesterone.

EXAMPLE 14

*6α-methyl-16α,17α-(β-methyl-α-phenylmethylenedioxy)-19-norprogesterone*

Following the procedure set forth in Example 12, but substituting 6α - methyl - 16α,17α - (β-methyl-α-phenylmethylenedioxy) - 19 - hydroxyprogesterone for 6α-methyl - 16α,17α - dimethylmethylenedioxy - 19 - hydroxyprogesterone, there is obtained 6α - methyl-16α,17α-(β-methyl - α - phenylmethylenedioxy)-19-norprogesterone.

EXAMPLE 15

*6α-methyl-16α,17α-(β-methyl-α-phenylmethylenedioxy)-19-norprogesterone*

Following the procedure set forth in Example 13, but substituting 6α - methyl - 16α,17α - (β- methyl - α-phenylmethylenedioxy)-19-oxoprogesterone for 6α-methyl-16α,17α-dimethylmethylenedioxy-19-oxoprogesterone, there is obtained 6α - methyl - 16α,17α - (β - methyl-α-phenylmethylenedioxy)-19-norprogesterone.

EXAMPLE 16

*6-methyl-6-dehydro-16α,17α-dimethylmethylenedioxy-19-oxoprogesterone*

Following the procedure of Example 10, but substituting 6 - methyl - 6-dehydro-16α,17α-dimethylmethylenedioxy - 19 - hydroxyprogesterone for 6α-methyl-16α,17α-methylenedioxy - 19 - hydroxyprogesterone, there is obtained 6 - methyl-6-dehydro-16α,17α-dimethylmethylenedioxy-19-oxoprogesterone.

Similarly, 6-methyl-6-dehydro-16α,17α - (β-methyl-α-phenylmethylenedioxy)-19-oxoprogesterone can be prepared starting with 6-methyl - 6 - dehydro-16α,17α-(β-methyl - α - phenylmethylenedioxy) - 19 - hydroxyprogesterone.

EXAMPLE 17

*6-methyl-6-dehydro - 16α,17α - dimethylmethylenedioxy-19 - norprogesterone and 6 - methyl - 6 - dehydro-16α,17α-(β-methyl-α-phenylmethylenedioxy) - 19-norprogesterone*

Following the procedure of Example 12, but substituting 6 - methyl - 6 - dehydro-16α,17α-dimethylmethylenedioxy-19-hydroxyprogesterone or 6-methyl-6-dehydro-16α,17α-(β-methyl-α-phenylmethylenedioxy) - 19 - hydroxyprogesterone for 6α-methyl-16α,17α-dimethylmethylenedioxy-19-hydroxyprogesterone or the procedure of Example 13, but substituting 6-methyl-6-dehydro-16α,17α - dimethylmethylenedioxy-19-oxoprogesterone or 6-methyl-6-dehydro-16α,17α - (β-methyl-α-phenylmethylenedioxy) - 19-oxoprogesterone for the 6α - methyl-16α,17α-dimethylmethylenedioxy-19-oxoprogesterone, there are obtained 6-methyl-6-dehydro-16α,17α - dimethylmethylenedioxy-19-norprogesterone and 6-methyl - 6-dehydro - 16α,17α-(β-methyl-α-phenylmethylenedioxy)-19-norprogesterone, respectively.

EXAMPLE 18

*6-methyl-6-dehydro-16α,17α-dimethylmethylenedioxy-19-norprogesterone*

To a solution of 100 g. of 6α-methyl-16α,17α-dimethylmethylenedioxy - 19 - norprogesterone in 10 ml. of dioxane 80 mg. of 2,3-dichloro-5,6-dicyanbenzoquinone are added and hydrogen chloride is bubbled through the resulting solution for thirty seconds. After two hours at room temperature, the mixture is filtered and washed with chloroform. The combined filtrate and washings are passed through 20 g. of Woelm neutral alumina (Activity I) and the alumina is washed with chloroform. Evaporation of the eluate in vacuo and crystallization of the residue gives 6-methyl-6-dehydro-16α,17α-dimethylmethylenedioxy-19-norprogesterone.

Similarly, starting with 6α-methyl-16α,17α-(β-methyl-α-phenylmethylenedioxy) - 19 - norprogesterone, 6α-methyl-6-dehydro - 16α,17α-(β-methyl-α-phenyl-methylenedioxy)-19-norprogesterone is prepared.

EXAMPLE 19

*6-methyl-6-dehydro-16α,17α-dihydroxy-19-norprogesterone*

A solution of 6 - methyl-6-dehydro - 16α,17α-dimethylmethylenedioxy - 19 - norprogesterone in 90% formic acid is heated at 42° for twenty-two hours. The solvents are removed in vacuo, the crude residue dissolved in methanol and treated under nitrogen with stirring with a 10% oxygen-free solution of potassium carbonate in water. After thirteen minutes at room temperature, the mixture is neutralized with glacial acetic acid and the solution concentrated in vacuo after the addition of water. Extraction with chloroform followed by drying over sodium sulfate and evaporation in vacuo furnishes a residue which on recrystallization from 95% methanol furnishes pure 6 - methyl-6-dehydro-16α,17α-dihydroxy - 19-norprogesterone.

EXAMPLE 20

*6-methyl-6-dehydro-16α,17α-(β-methyl-phenylmethylenedioxy)-19-norprogesterone*

To a suspension of 6-methyl-6-dehydro-16α,17α-dihydroxy-19-norprogesterone in acetophenone is added 72% perchloric acid and the mixture is agitated at room temperature for three hours. The mixture is then neutralized with dilute sodium bicarbonate and the acetophenone is removed in vacuo. The resulting crystalline solution is filtered and the crystals washed with water to yield after recrystallization the 6 - methyl - 6 - dehydro-16α,17α-(β-methyl-phenylmethylenedioxy)-19-norprogesterone.

Similarly, substituting other like acetones or ketones for the acetophenone of Example 20, the respective 16,17-acetal or ketal derivative is obtained.

This invention may be variously otherwise embodied within the scope of the appended claims.

What is claimed is:
1. A compound selected from the group of steroids having the formula

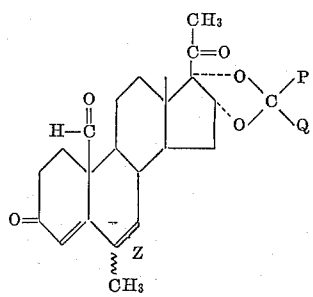

wherein P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and mono cyclic heterocyclic and Z is selected from the group consisting of a single and double bond.

2. 6α - methyl - 16α,17α - dimethylmethylenedioxy-19-oxoprogesterone.

3. 6α - methyl - 16α,17α - (β-methyl-α-phenylmethylenedioxy)-19-oxoprogesterone.

4. 6 - methyl - 6 - dehydro - 16α,17α-dimethylmethylenedioxy-19-oxoprogesterone.

References Cited by the Examiner
UNITED STATES PATENTS

| | | | |
|---|---|---|---|
| 3,039,926 | 6/1962 | Shull | 167—65 |
| 3,158,630 | 11/1964 | Cross | 260—397.4 |
| 3,206,459 | 9/1965 | Cross | 260—239.55 |
| 3,234,214 | 2/1966 | Diassi et al. | 260—239.55 |

LEWIS GOTTS, *Primary Examiner.*

H. A. FRENCH, *Assistant Examiner.*